Figure 10:
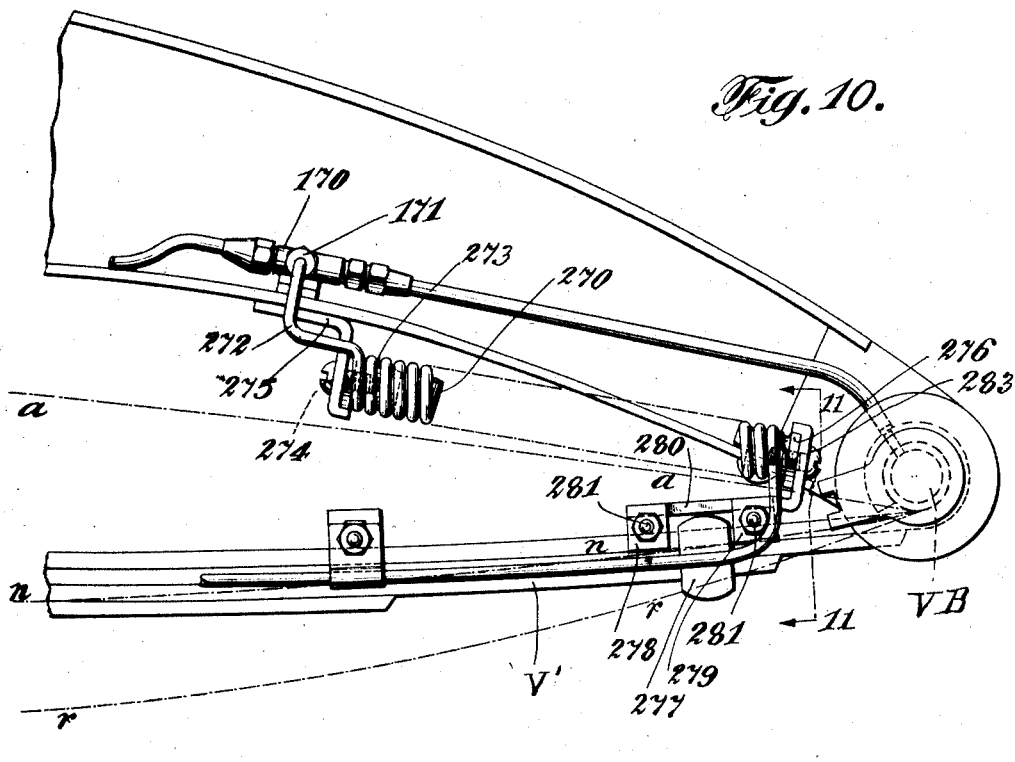

Feb. 16, 1932.    J. BIJUR    1,845,827
CHASSIS LUBRICATION
Filed Feb. 28, 1924    5 Sheets-Sheet 1
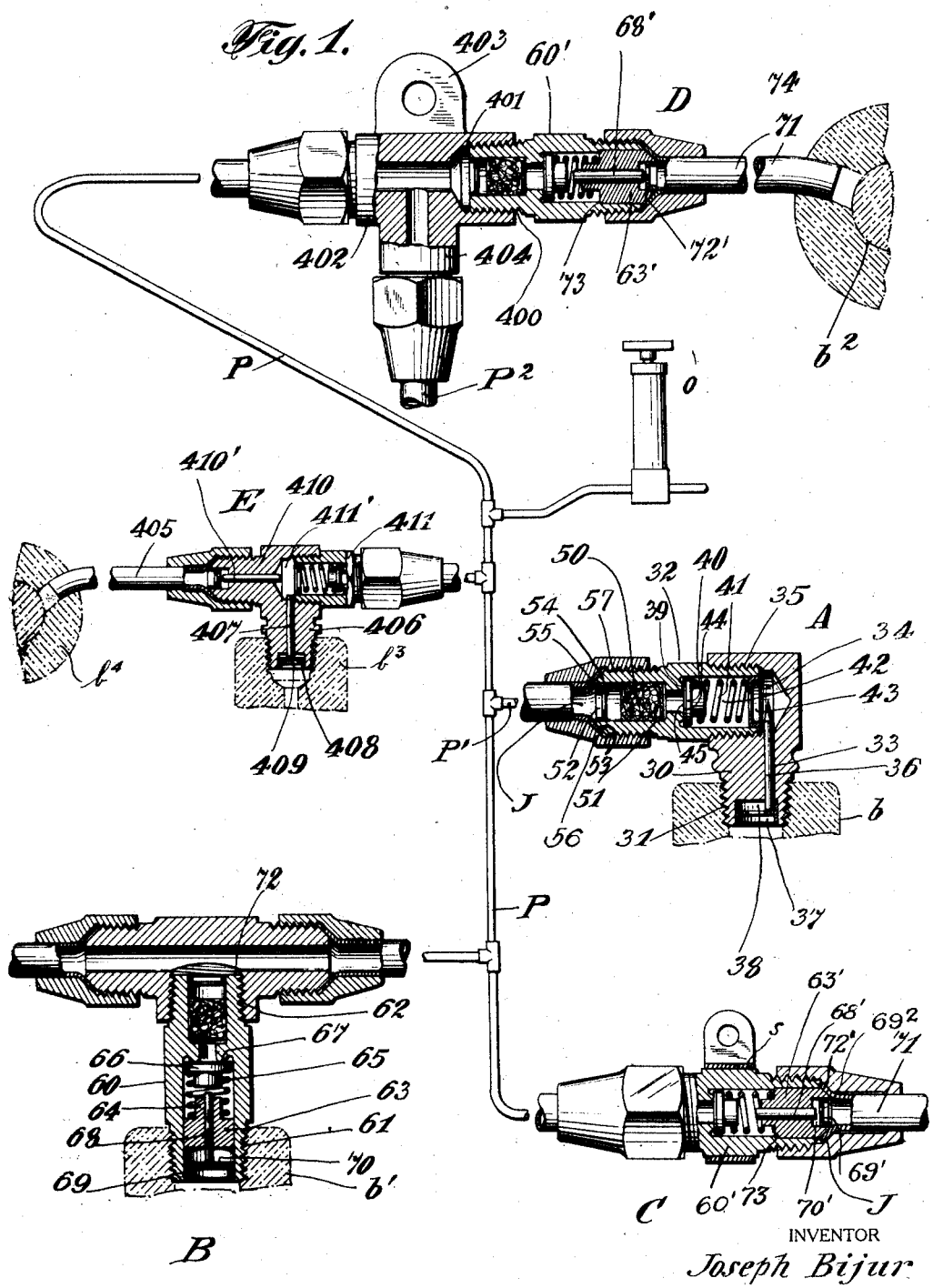

Feb. 16, 1932.  J. BIJUR  1,845,827
CHASSIS LUBRICATION
Filed Feb. 28, 1924   5 Sheets-Sheet 2
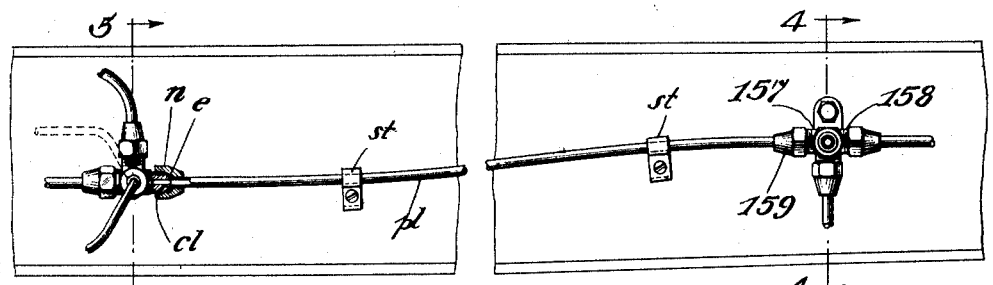
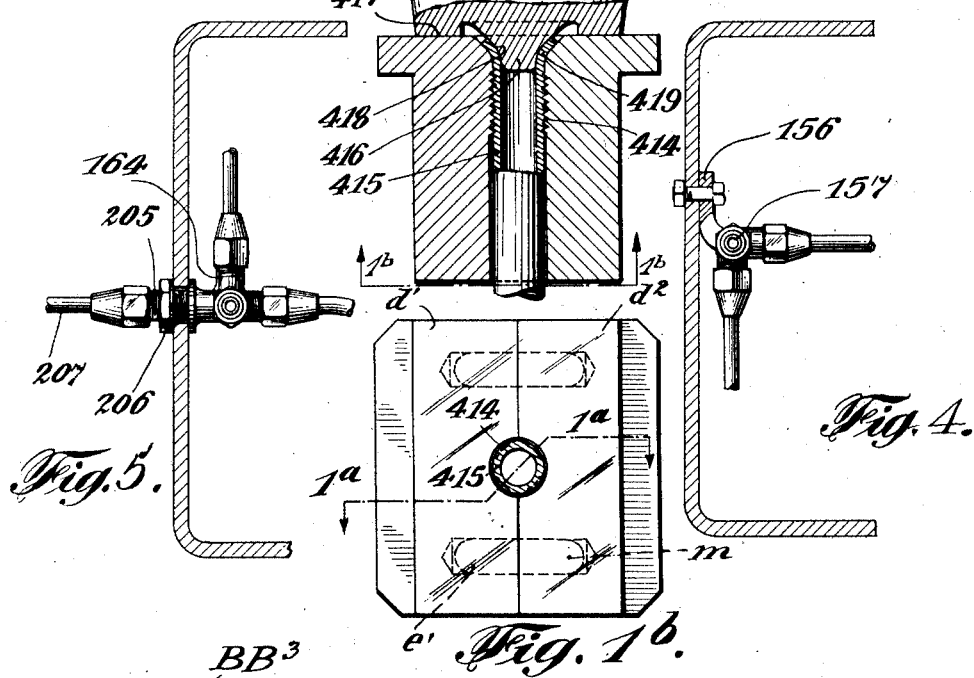
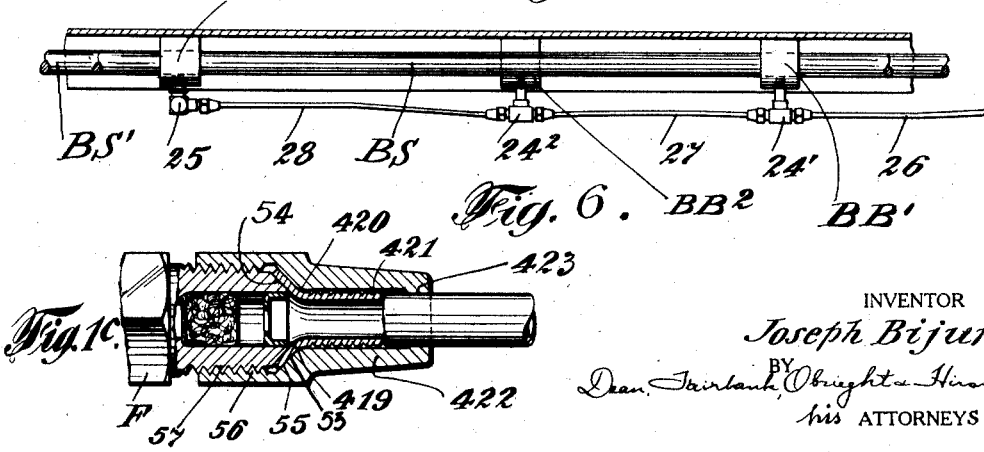
INVENTOR
Joseph Bijur
BY
his ATTORNEYS

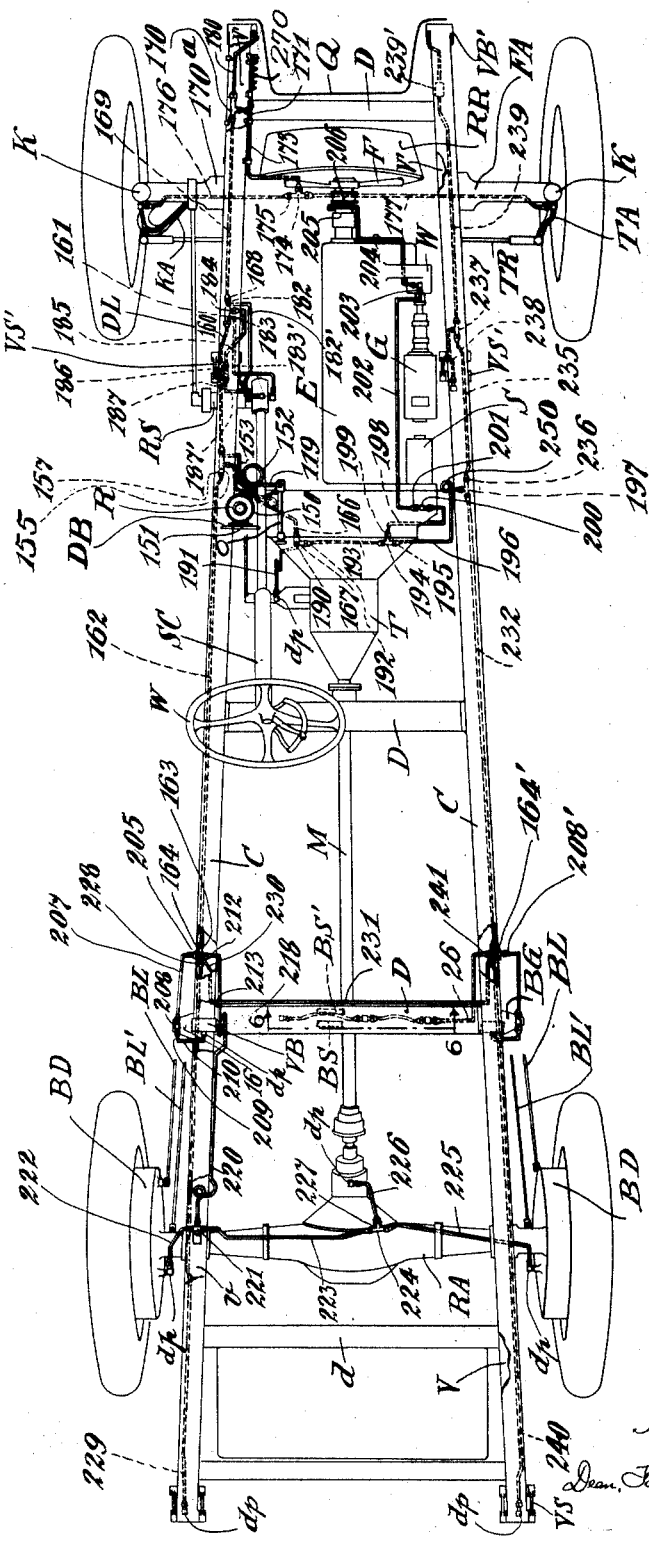

Feb. 16, 1932. J. BIJUR 1,845,827
CHASSIS LUBRICATION
Filed Feb. 28, 1924   5 Sheets-Sheet 4
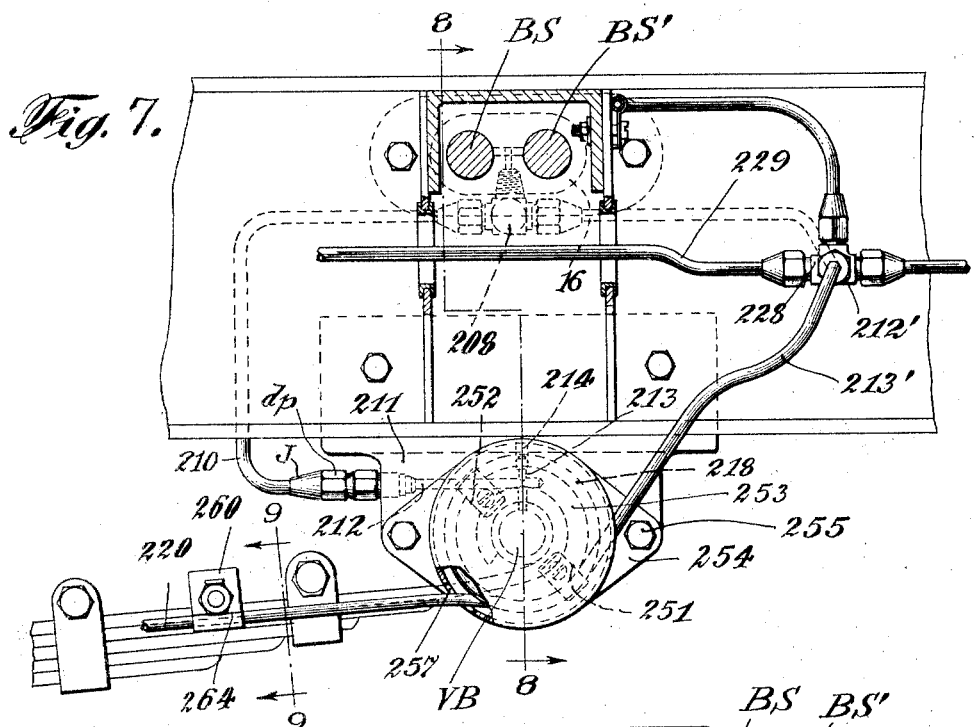
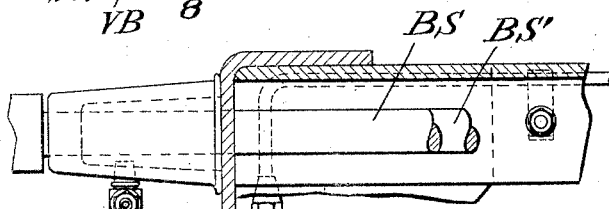
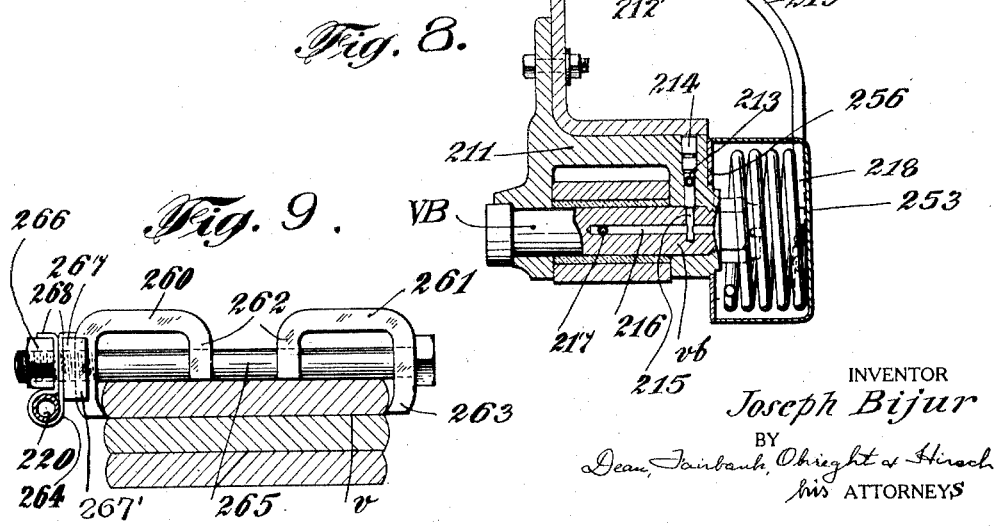
INVENTOR
Joseph Bijur
BY
his ATTORNEYS Feb. 16, 1932.  J. BIJUR  1,845,827
CHASSIS LUBRICATION
Filed Feb. 28, 1924  5 Sheets-Sheet 5

INVENTOR
Joseph Bijur
BY
his ATTORNEYS

Patented Feb. 16, 1932

1,845,827

UNITED STATES PATENT OFFICE

JOSEPH BIJUR, OF NEW YORK, N. Y., ASSIGNOR, BY MESNE ASSIGNMENTS, TO AUTO RESEARCH CORPORATION, A CORPORATION OF DELAWARE

CHASSIS LUBRICATION

Application filed February 28, 1924. Serial No. 695,740.

My present invention relates broadly to remote-control fluid distribution and is concerned in certain preferred applications with systems, methods, installations and the constituent elements thereof for lubricating a multiplicity of bearings on a machine, a group of machines, or mechanical installations generally from a readily accessible point of control.

The invention relates especially to lubricating installations of the type in which lubricant pressure is transmitted from a pressure source, such as a pump, through a system of lubricant-filled piping, concurrently to various distributed outlets therein, which communicate with the bearings. The invention is shown exemplified in a preferred application to the lubrication of all or most of the bearings on the chassis of a vehicle, such as an automobile or a motor truck.

It is an object of the invention to provide a system of the above type, devoid of oil cups, grease cups or other bulky fittings, which shall be easily and reliably operable, to deliver predetermined charges or predetermined percentages of a charge of oil from a reservoir, simultaneously to a multiplicity of distributed bearings, by a single simple non-selective operation.

Another object is to provide a system of the type referred to, in which a maximum number of bearings may be simultaneously lubricated, substantially unfailingly, and with a minimum number of flow controlling devices or fittings.

Another object is to provide an installation of the type referred to in which the troublesome operation of cleaning fittings and the like, to maintain the system in operation, is eliminated, and in which an injured fitting can be easily removed and replaced without loss of oil and without the possibility of deranging the installation.

Another object is to provide a system of the type mentioned, the operativeness of which as a whole, will not be impaired, even if a localized area of the pipe line be destroyed and in which a destroyed length of pipe can be easily replaced without the need for first draining the system of oil.

In the preferred method and apparatus for carrying out the above and other objects, the lubricating oil is forced through metal pipes of small diameter, to the bearings or to groups of bearings in parallel by pressure applied at one point of control. Each line is normally kept filled by appropriate relief valves preferably at or near the bearings, said valves opening under applied pressure permitting delivery of oil to the bearings.

In a preferred form of my invention there is interposed, in the path of the flow to each bearing and in the vicinity thereof, a pressure-absorbing or seepage resistance, which substantially determines the rate of oil flow past the corresponding relief valve to said bearing.

A desirable type of seepage resistance, preferred in many applications, is of metal or other non-porous material, affording one or more minute crevices for the passage of the oil from the line. A satisfactory element includes a small-bore tube, plugged with a rod or wire, a few thousandths of an inch smaller in diameter, providing a minute crevice, cylindrical in cross-section, through which the oil passes slowly to the bearing when sufficient pressure is applied. The seepage resistance or obstruction and the associated valve are preferably located in the interior of a pipe fitting, which I call a "drip plug" which may be screwed in lieu of an oil cap into a part to be lubricated. The outlet crevice of each drip plug is restricted to such extent as to offer an obstruction to flow of lubricant several times greater than the resistance to flow encountered in the length of the pipes, added to that imposed by the valves and to that encountered in the bearings.

In this application the pump is mounted at a convenient place on the chassis frame, and main conduits may extend along the sides of the frame, with taps each provided with a drip plug from which the various parts carried on the frame, such as the spring shackles and the steering gear are supplied in parallel with lubricant, said piping having, moreover, one or more conduits or taps also provided with drip plugs and extending to the bearings on the unsprung parts or axles, for instance, to the king pin, the tie rod clevises and the brake linkage, and to other parts movable with respect to the frame.

It is among the objects of the invention to provide for a vehicle installation, a serviceable conduit of small diameter and low cost, which is easy to install on any of a wide variety of vehicles, regardless of the construction or type of frame or springs, which provides the required yield or flexibility where flexure should occur, yet is not subject to whipping, which remains tight even for relatively high fluid pressure, and which is substantially proof against rupture or leak from vibration of the moving vehicle even in hard usage.

The conduit element through which fluid or pressure is transmitted between the chassis frame and the axle should accommodate relative movement of these parts, which occurs as the springs flex during travel of the vehicle, and this relative movement is of greater range than that between other parts of the installation.

Among other objects of the invention are to provide a conduit in the above relation, which has no exposed unprotected parts likely to be bent or broken off by the usual impacts encountered in ordinary usage, which is inconspicuous and which, while accommodating without undue strain at any part of the conduit, the relative motion between the frame and the axle, or between other elements of the structure, is nevertheless mechanically so strong and is retained in place upon the vehicle structure so securely as not to be torn loose by the driving of the vehicle through brush or bushes, which will suffer no substantial injury from pelting by ice or loose stones that may be thrown up from the road by the movement of the vehicle thereon, which will not be torn off or damaged by mud frozen thereonto, and which will not be disturbed by handling as by removing mud in cleaning the vehicle.

Because of the high resistance of the drip plugs, the rate of flow through the mains is very slow, hence pipes of extraordinarily small bore may be used to convey the oil, without objectionable loss of head. Such piping is inexpensive and can easily be formed to follow around obstructions on the frame and to provide the flexibility for the yielding branches by coiling preferably into a helix, serving as a hollow coil spring to accommodate angular or longitudinal motion. The pipe being light has low inertia compared to its strength and may bridge unsupported through the air for a foot or more from the frame to an unsprung part of the chassis, without whipping, or may extend lengthwise and be detachably clamped to a vehicle spring or to some other structural part connecting the frame and the axle, leaving only a short hinging or bridging portion unsupported between its ends. Thus, I provide a continuous oil-tight seamless metal duct from the frame to the axles, to sustain the oil pressure, and I eliminate the likelihood of leakage incurred in a conduit of so-called flexible hose, or in swiveling joints under pressure.

Where two or more bearings on the installation are associated, it is preferable to provide lubricant therefor through a single drip plug, which preferably delivers to the uppermost of said bearings, the structure being provided with one or more ducts that lead the lubricant seriatim to the bearings.

Figure 11:
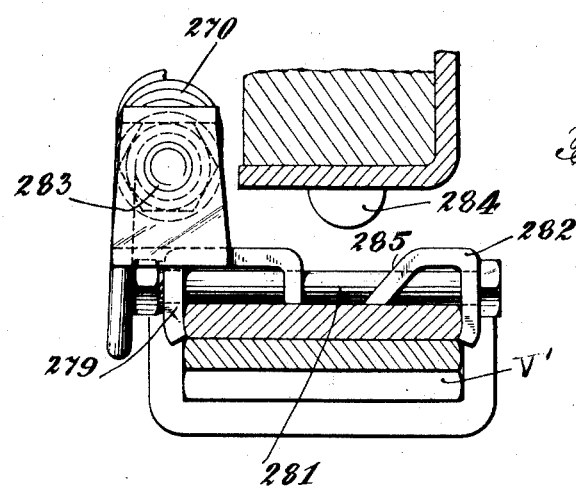

In the accompanying drawings in which are shown one or more of various possible embodiments of the several features of the invention, Fig. 1 is a diagrammatic view showing the application and construction of various forms of drip plugs, Fig. 1a is a view in longitudinal cross-section illustrating the method of flaring a pipe end for a coupling and taken on the line 1a—1a of Fig. 1b, Fig. 1b is a view taken along the line 1b—1b of Fig. 1a, Fig. 1c is a view in longitudinal cross-section on an enlarged scale, illustrating the completed coupling, Fig. 2 is a diagrammatic plan of a motor vehicle showing the lubricating installation thereon, Fig. 3 is a side view on a larger scale indicating the construction and method of piping installation, Fig. 4 is a sectional view taken along the line 4—4 of Fig. 3, Fig. 5 is a sectional view taken along the line 5—5 of Fig. 3, Fig. 6 is a sectional view on an enlarged scale taken along the line 6—6 of Fig. 2, Fig. 7 is a side elevation on a larger scale showing the lubricating arrangement associated with the rear spring, Fig. 8 is a sectional view taken along the line 8—8 of Fig. 7, Fig. 9 is a transverse sectional view taken along the line 9—9 of Fig. 7, indicating the spring clamp arrangement, Fig. 10 is a side elevation indicating the conduit arrangement associated with the front spring, and Fig. 11 is a detail transverse sectional view taken along the line 11—11 of Fig. 10.

Referring now to Fig. 1, I have shown a centralized lubricating system, the distributing piping P of which includes branches P′, shown merely diagrammatically to suggest a conduit arrangement for supplying a multiplicity of distributed bearings of a mechanism or system of mechanisms, such as a factory installation. A single suitable source of oil pressure is indicated diagrammatically at O and serves, when actuated or in operation, to place the entire piping under pressure, substantially sustained at or in advance of each bearing by a highly restricted pressure absorbing outlet in the pipe. The exit of the oil to the bearings will thus be at a slow predetermined rate which depends on the pressure at the source and is largely determined at each outlet by the resistance thereat.

*The drip plug construction*

The highly restricted outlets are embodied in pipe fittings, which I call "drip plug fittings", special types of which are shown in Fig. 1, and on an enlarged scale at A, B, C, D and E. Each type of fitting is primarily intended to be used in a definite relation, as will appear below.

To prevent slow draining of the pipe line while the pressure source is idle, which draining might occur by entry of air at a drip plug at relatively high level, and escape of oil through one or more drip plug fittings at lower level, it is desirable to provide a relief valve at or in association with each said fitting.

At A is shown a drip plug fitting of elbow form, having more or less general application, and shown supplied from the end of a branch pipe P'. The drip plug has a stem illustratively shown threaded by pipe thread 31 into a bearing $b$ in lieu of an oil or grease cup. A relief valve cartridge 32 is threaded by pipe thread connection 35 into a corresponding transverse well 34 in the plug 30.

The plug-fitting 30 has a longitudinal circular bore 33 therein of approximately $\frac{1}{16}$ inch in diameter extending from near the base of well 34 and therefore eccentric of the fitting so as to afford a substantial length of thread 35 for secure hold of the valve fitting 32. Bore 33 is plugged with a length of metal wire or pin 36 of diameter only in the order of .002 inches smaller than the bore to leave but a minute annular crevice about ½ inch long for exit of the lubricant. The pin is maintained in place by a metal cup 37, press-fitted into a socket 38 in the base of the plug 30, and is provided preferably with a central hole through which the lubricant passes.

The cross-sectional area of the annular crevice, though minute, can be made uniform within very fine limits, since it is the differential between the cross-section of a bore and a wire plug, both of appreciable dimensions and both of which can be easily formed accurately. Greater difficulty would be encountered in forming accurately a minute aperture to provide the necessary resistance to flow, and such aperture would, moreover, be more easily clogged by a minute solid particle, than the preferred annular crevice.

The relief valve cartridge unit 32 is formed with an integral valve seat 39, against which the disk relief valve 40 is pressed by a coil spring 41, within the bore 42 of the fitting, said spring reacting against a perforated metal cup 43, press-fitted into the inner end of the cartridge 32. In advance of the valve 32 is plugged a wad 50 of felt which serves as a strainer to intercept any chips that may be picked up by the oil. The wad is backed by a cup 51 of fine metal mesh, forced thereover the latter to prevent any minute fibers from the felt passing to the valve seat 39. The felt is maintained in place against escape from the cartridge by a press-fitted perforated cap 52 at the inlet end thereof.

To assure effective seating of the relief valve, the valve seat is preferably highly burnished and the seating surface of the valve is provided with a seating facing 44 of a material yielding to compensate for possible irregularities in the seat, smooth, to seat completely under light pressure, substantially impervious and chemically inert to oil and non-sticking. In one type of construction, the seating portion comprises an oil-proof yielding backing with a smooth oil-proof, pliable and non-sticking facing to engage the valve seat. The backing may be smooth cork, or oil-proof rubber compound, one commercial form of which is known as "Hippohyde", varnished cambric, or any oil-proof gasket material. The facing may be metal foil, animal membrane, sheet celluloid, non-porous leather or leather substitute, or oil paper, linen or silk. In the drawings, the rigid valve disk has secured thereto, the yielding backing layer 44 as of varnished cambric covered with the facing 45 as of oil paper. If oiled or varnished cambric, paper, linen or silk is treated in any of the known methods to avoid the sticky surfaces, it may be used in lieu of the two-ply backing and facing construction just described, but the latter is preferred.

The elbow drip plug fitting A described, serves more particularly as a terminal fitting, that is, a fitting connected to the extreme end of a pressure line, said fitting delivering through the restriction pin thereof, the entire discharge therethrough to the bearing at which the fitting is applied. I have accordingly designated the fitting "terminal drip plug". The preferred coupling J between the lubricant delivery pipe and the drip plug fitting, is shown on an enlarged scale in Fig. 1c and will be described below.

At B is shown a drip plug fitting similar in general principle to that described, but formed in a straight line rather than of elbow formation, as fitting A. This type of drip plug has a particular field of application in association with a complementary pipe fitting, to feed lubricant to a bearing, substantially in the run of a line rather than at the terminal or end of the line, and I have accordingly designated it "line drip plug". In the application shown, the line drip plug comprises the pipe fitting 60, which has a pipe thread 61 at its outlet, to be applied in the bearing $b'$, and a similar pipe thread 62 at its inlet end, shown applied in a tubular pipe connecting fitting in the run of the line. The line drip plug fitting 60 in this embodiment has a plug 63 press-fitted thereinto, with a hub extension 64 encircled by spring 65 that urges valve 66 against its seat 67. The restriction wire or pin 68 fits in an axial bore in plug 63 and is retained against falling out of the fitting by a perforated press-fitted cap 69, backed by a sheet 70 of fine wire mesh. It will be seen that when pressure is applied at the source, the line drip plug will feed lubricant at the predetermined rate to the associated bearing, while the main charge is passed on through the length of the line which is tapped by said line drip plug. Other features of construction and of the operation of the line drip plug B will be apparent from the description of the terminal drip plug A.

Where there is insufficient room to affix at the bearing, the drip plug to supply the same, it may be preferred to employ the arrangement of fitting shown at C in Fig. 1, connecting such fitting to the bearing (not shown) through an intervening length of pipe 71. For this purpose, I provide a drip plug fitting of the straight formation shown at B rather than of the elbow formation shown at A, said drip-plug C in the length of the line and attached to the supporting structure as by a strap or staple $s$. As the outlet end of the small diameter fitting B has a pipe thread, and an insufficient thickness of wall for the bevel to effect a coupling connection of the type shown at J with the flared pipe end, the construction shown at C is modified somewhat, as shown, with respect to that at B, similar parts having corresponding reference numerals primed however. In the fitting C, the plug 63' is seated against a shoulder 73 in the bore of pipe fitting, and protrudes from said fitting. The restriction wire or pin 68' is kept from falling out of its bore by a cap 69' press-fitted into a corresponding socket 70' in plug 63' and having an eccentric outlet aperture $69^2$.

Another type of drip plug fitting is shown at D, and this is particularly useful for delivering lubricant in parallel to two bearings, at one of which, for instance, because of lack of room, it is not desired to directly apply a drip plug. In this relation, it will be seen that a drip plug structure 60' generally similar to that at C has a pipe thread 400 at the inlet or felt wad end thereof, rather than the cylindrical screw thread in the fitting at C, said pipe thread fitting into a corresponding socket 401 in a T fitting 402 by which it is carried. The T fitting may be a casting provided with an integral mounting lug 403 by which it is secured to the supporting structure and as shown, has a direct passage therethrough supplied from the pipe P and delivering to the drip plug structure. The integral stem 404 of the T fitting feeds through a pipe $P^2$ to some other bearing, the flow through said pipe controlled by an appropriate drip plug (not shown) in advance of or at a bearing (not shown) supplied therefrom.

At E, I have illustratively shown a fifth type of drip plug fitting, controlling the flow not only to the bearing $b^3$, at which it is mounted, but also that to a line 405 which may lead to some other bearing $b^4$. The construction shown comprises an elbow casting having a supporting stem 406 threaded into the bearing and provided preferably with an axial restriction pin 407 supported by a friction-fitted perforated cap 408 backed by a sheet 409 of metal mesh. The arm 410 of the elbow fitting has a restriction pin 410' held in place by means similar to that for retaining pin 407 in place. Into a well 411' at the back of arm 410 and coaxial therewith is threaded by a pipe thread as shown, a valve cartridge 411 preferably identical with the cartridge 32 of fitting A. Pipe P is connected by a coupling of the type shown at J to the inlet of cartridge 411 and pipe 405 leading to another bearing is connected by a similar coupling to the end of restriction arm 410. In the compound drip plug fitting, just described, it will thus be seen that when pressure is applied to the line, the valve in cartridge 411 will be forced open and lubricant will drip past the restriction determined by pin 407 to the bearing $b^3$ and in parallel and simultaneously therewith, past restriction 410' to and through pipe 405 to the bearing $b^4$ at the end of the latter.

As shown in the drawings, the restriction pins in all of the fittings described, preferably protrude beyond the ends of the bores into which they fit, so that the restriction crevice is of substantially uniform effectiveness from end to end of the restriction bore, where local variations in resistance might be incurred if the restriction pin were shorter than the bore therefor.

*The pipe coupling (Figs. 1a, b and c)*

The various couplings indicated by Letter J are formed, as specifically illustrated at A on Fig. 1 by flaring the end of the pipe at 53, which pipe may be of copper or other soft metal. In Fig. 1a the flared pipe end is clamped by the correspondingly beveled interior 55 of the nut 56 against the correspondingly sloping rim 54 of the end of the fitting, said nut encircling the pipe end and threaded over the end of the fitting.

The preferred specific construction of coupling will be understood from a preferred method of producing the flared pipe end, as shown in Figs. 1a and 1b. For this purpose, the die block is formed in two segments $d'$ and $d^2$, held in alignment by dowel pins and provided with segmental gripping threads 414 adjacent the bevel at which the flare of the pipe is formed. When the die halves are pressed together to grip the pipe 415 therebetween, the segmental threads will bite into the latter. The pipe will then be deformed somewhat to protrude into the parts of the die block, which are devoid of threads. When the punch $l$ which is provided with a conical tip 416 is depressed, said tip will spread or flare the pipe end against the bevel in the die block, the threads 414 effectively gripping the pipe length, so that the latter will not be pushed out of place by the operation of the punch. Preferably the punch is provided with a peripheral stop shoulder 417, which contacts the die block at the end of the punching stroke, so that the relatively enormous impact at the end of the punching stroke, will be exerted against the die block, rather than against the flared pipe end, and the latter will not be hardened or rendered brittle as it might be, if it were subjected to the full impact of the sharp blow of the punch. As shown in the drawings also, the bevel of the die block and the punch cone, are curved at the neck thereof, as at 418, on a radius of about $\frac{1}{16}$ inch, so that the pipe flare, as shown, will be rounded at its neck as at 419. By this arrangement, I avoid weakening the pipe at the neck of the flare, which might occur if the metal were sharply bent thereat.

As appears at 420, the sloping shoulder 55 of the nut is curved to conform with the flare of the pipe end, as to provide an ample gripping area thereat. The nut 56 is of slightly larger diameter than the pipe, as shown at 421, along the length of an integral hub or extension 422 thereof, the outer or extreme end of the nut extension fitting snugly as at 423 about the pipe for a length of about ¼ inch. By this construction, it will be seen that the length of pipe within the nut need not be straightened, preparatory to making up the coupling, since the pipe is gripped by the nut only at the extreme inner and the extreme outer ends of the latter. Furthermore, the nut will be rotated freely relative to the pipe, as the coupling is made up, as there is but a small surface engagement between the nut and the pipe, as distinguished from a construction in which the entire length of the nut snugly embraces the pipe. The type of coupling just described is designated in its entirety as coupling J, and may be used throughout the installation for attachment of the ends of lengths of copper or other soft metal pipe.

The generalized lubricating system described in the foregoing, and including a reservoir R and a pump O generally similar to those set forth in my prior Patent No. 1,632,771 of June 14, 1927, and connecting oil tight non-dilatable piping, and highly restricted drip-plug outlets to the various bearings, has a specially desirable field of application in chassis lubrication.

In Fig. 2 is shown a substantially complete layout of a lubricating installation on a typical motor vehicle chassis. The chassis shown has a frame composed of longitudinal channel bars C connected by cross-pieces D and with an engine E mounted thereon near the forward end. The engine has the usual accessory machines, such as the water pump W and generator G, the engine starting motor S and the usual fan F which is back of radiator R R. Back of the engine are the clutch, operated by a pedal (not shown), the transmission box assembly T and the propeller shaft M driven therefrom and extending to the rear axle RA, upon which the rear end of the channel frame is sustained by interposed vehicle springs V hinged at their forward ends as at V B and connected at their rear ends to the back of the channel frames as by shackles V S. The forward axle F A sustains the front end of the channel frame by interposed vehicle springs V', which are hinged at their forward ends at V B' and connected by shackles at their rear ends, as at V S'. The front or steering wheels are operated from the usual steering wheel at the upper end of the steering column S C, which is connected through rock-shaft R S on frame C to operate the drag link D L, the latter connected at its forward end to the knuckle steering arm K A. The usual tie rod T R connects the tie rod arms T A on the two knuckles.

The brake cross shafts B S and B S' which are mounted in lugs B G, protruding from opposite sides of the channel frame operate respectively through links B L and B L', the foot and emergency brakes (not shown) coacting with brake drums B D on the rear wheels, and said cross-shafts are, in turn, actuated by linkage (not shown) operated from the brake pedal and lever (not shown).

By my invention, I accomplish lubrication with a minimum of effort from one control station conveniently accessible on the vehicle, of all of the bearings upon the chassis whether on the unsprung axles or on the sprung chassis frame. Among the various bearings lubricated from the central source, as shown in the illustrative embodiment, are the mounting bolts for the springs, the steering gear, the brake linkage, the clutch and brake shaft pedal bearings, the fan bearing, the king pin and the tie rod bearings.

The oil reservoir is preferably secured as by a supporting strap 150 to the dash D B, the strap being drawn tight about the reservoir by a bolt 151.

The pump may be secured above the instrument board and below the foot board.

The copper pipe 119 which connects the outlet of the reservoir to the inlet of the pump has extra length in the form of a loop 152 which facilitates making up the connecting unions and provides yield to accommodate without strain on the unions, any small relative displacements between the reservoir and the pump.

At, or in advance of each of the bearings on the chassis is located a suitable drip plug of one of the various types shown in Fig. 1, at A, B, C, D and E.

The reservoir may be located in a position convenient for filling, and where its contents may be kept fluid in cold weather by the heat from the engine. The pump is located in position convenient for operation by a person at the driver's seat.

For distribution of the lubricant from the pump to the various bearings or drip plugs on the chassis, I provide a system of piping including various dividing, branch or multiple outlets, or cross fittings located at various parts of the vehicle which may serve the function, as is apparent, not only of distributing the lubricant but of positioning upon the vehicle, the pipe lengths connected therebetween.

In the illustrative embodiment shown, the pump outlet pipe 153 leads to the inlet nipple of a primary distributing fitting 155, which is bolted at the inside or concealed side within the channel C. Each of the various other nipples of primary fitting 155 supplies a corresponding secondary fitting, each of the latter, in turn, leading through corresponding piping, in some cases directly to bearings to be lubricated, in other cases by way of further dividing fittings.

The construction and mounting of the primary fitting is shown apart in Figs. 3 and 4. As shown, the mounting lug 156 is integral with the fitting and its support engaging surface is offset laterally from the axial nipple or nipples 157 and 158 thereof, so that when mounted in the channel frame, ample room is left for application of a wrench to tighten the nut 159 for making up couplings of the type shown at J in Fig. 1. One of the nipples 158 of primary T fitting 155 is connected to a pipe length 160 which leads forward to the rear nipple of fitting 161 on the channel frame. Another nipple of the primary fitting is connected to a pipe length 162 which leads rearward to the forward nipple 163 of a fitting 164, and a lateral nipple of the primary T fitting leads through the transverse length of the pipe 166 to fitting 167 on the engine. The advance nipple 168 of fitting 161 is connected through another pipe length 169 to the rear of a T, drip plug fitting 170 of the type shown at D in Fig. 1, near the forward end of the frame. The drip plug outlet of fitting 170 is connected to a length of pipe 180, the forward end of which extends through the mounting casting for the front spring bolt, to supply the bearing surface thereof. By this arrangement, I avoid placing the drip plug directly at the forward spring eye bolt, where it might be subject to injury.

The lateral nipple 171 of fitting 170 leads to flexible bridging piping 270 connected to front spring V and near the forward end thereof, thence along the front spring V through a resilient pipe element or spring run 173 and along the axle to the stem 174 of a T fitting 175, mounted on the front axle. The specific bridging and spring runs are shown in Figs. 10 and 11 to be described below. Pipes 176 and 177 longitudinally of the front axle are supplied from the lateral nipples of T fitting 175 and lead respectively to outlet fittings rigid with the axle and at the pivot axes of the left and right knuckles K, at which the lubricant is divided, to supply the various knuckle bearings, by a suitable arrangement, the details of which are not material, taken by themselves, to the invention claimed herein, and therefore, not described.

Lateral nipples 182 and 183 of fitting 161 lead through pipes 182' and 183' to different parts of the steering gear. A branch outlet nipple 184 from the T fitting 161 leads through a pipe 185 to a dividing fitting 186 of the type shown at E in Fig. 1, the drip plug restriction (not shown) in the stem of which supplies lubricant to the upper bearing bolt of shackle V S' of the front spring, while the drip plug restriction in outlet arm 187 thereof is connected through a pipe 187' to supply a part of the steering gear. The shackle is preferably arranged to feed excess lubricant through an appropriate duct in one of the links thereof, from the upper to the lower bolt. This construction is not shown herein, as the details thereof, taken by themselves, are no part of the invention claimed herein.

The dividing fitting 167 which is secured to the flywheel housing and is supplied directly from the primary dividing fitting through pipe length 166, heretofore referred to, has a lateral outlet nipple 190 which leads through a pipe 191 to lubricate through a drip plug fitting $dp$ of the elbow type, shown at A in Fig. 1, the clutch and brake pedal shafts (not shown). The other outlet of fitting 167 leads through pipe 193 to a T-fitting 194 also mounted upon the engine crank case. The lateral outlet 195 of fitting 194 leads through pipe 196 to T-fitting 197 on the right channel frame and communicating with the right main. A metal pipe 198 is supplied from the T-fitting stem 199 and leads to a drip plug fitting 200 of the type shown at B in Fig. 1, which is secured to the flywheel housing and lubricates the gear (not shown) of the starting motor S. The lateral outlet 201 of fitting 200 feeds lubricant through pipe 202 to drip plug fitting 203 at the water pump. Drip plug 203 is of the general type shown at D in Fig. 1, but has a lateral outlet nipple at right angles to the inlet nipple, and connected by pipe 204 to the shaft 205 of the fan, the copper pipe being looped as at 206 over the shaft to accommodate adjustment for the fan belt.

The dividing pipe fitting 164, as shown in the drawings, Figs. 2, 3 and 5 supplies lubricant to the bearing 16 for the brake cross shafts BS and B S' and at the exterior or exposed side of the channel frame. To avoid looping the conduit pipe under the channel frame for reaching the said bearing, I insert the nipple 205, which leads to said exposed bearing through a corresponding aperture in the channel frame, said nipple serving preferably also as the mount for the multi-nipple or dividing fitting 164 and dispensing in this case with the extra lug 156 used for mounting the primary and some of the other secondary dividing fittings. As best shown in Fig. 2 in connection with Figs. 3, 5, 7 and 8, the fitting 164 is of cross formation, and the mounting nipple 205 is clamped against the frame by a nut 206. The exterior pipe 207 is connected to the mounting nipple by a coupling of the type shown at J, and delivers through a fitting 208 of the type shown at B in Fig. 1, the restriction plug of fitting 208 delivering to the end bearings of the brake cross shafts at the lower side of which it is mounted, as best shown in Fig. 7. The lateral outlet 209 of fitting 208 is connected by a length of pipe 210 fixed by a coupling J to a drip plug $dp$ having a pipe thread outlet threaded into the fixed casting or forging 211 for the front bolt V B of the rear spring to drip to the bearing surface thereof in the well understood manner.

Referring more particularly to Figs. 7 and 8, the casting 211 has a bore 212 communicating with the socket for the drip plug and delivering to a vertical bore 213, plugged at its upper end 214 and delivering to a radial bore 215 in the bolt V B maintained in registry with bore 213. The bore 215 communicates with an axial bore 216 through the bolt, which, in turn, delivers to the bolt bearing surface through one or more of a plurality of radiating bores 217. The front bolt V B' heretofore referred to, is preferably of similar construction.

A nipple 212' on fitting 164 is connected to a pipe 213' which supplies the rear axle, said pipe provided with a few helical turns 218 to the rear of and coaxial with the hinging bolt V B of the rear spring and extending lengthwise along the rear spring in a run 220 to be described hereinafter. The rear end of run 220 leads to the stem of T-fitting 221 anchored to the rear axle R A. Pipe 222 from one lateral nipple of fitting 221 supplies the corresponding wheel bearing at an outlet or drip plug fitting $dp$. Pipe length 223 along the rear axle leads to T-fitting 224 anchored to said axle. One nipple of fitting 224 supplies the other wheel bearing through fitting $dp$ at the delivery end of pipe 225 while branch pipe 226 from stem 227 supplies the differential pinion shaft bearing at a drip plug fitting $dp$. A nipple 228 on the cross-fitting 164 supplies the length of main 229 which leads rearward along the channel frame to supply the rear spring shackle V S.

Nipple 230 on fitting 164 delivers to a transverse pipe 231 along a cross-bar D, which leads to a cross-fitting 164' similar to fitting 164, and at the right-channel frame, and similarly connected through a mounting nipple 208' to lubricate the right end of the brake shafts and the rear shackle. The forwardly extending pipe 232 from cross-fitting 164' leads to pipe fitting 197, heretofore referred to. A length of pipe 235 from the forward nipple 236 of T-fitting 197 supplies the T-fitting 237, the lateral outlet of which leads through a length of pipe 238 to lubricate the shackle V S' for the front spring at the right hand channel frame through a drip plug terminal. The forward nipple of T-fitting 237 leads through a pipe 239 to supply the forward bolt VB' of the front spring through a drip plug 239' of the type shown at C in Fig. 1. Pipe 240 is connected to the rear nipple of fitting 164' and supplies the rear shackle of the right-hand rear spring, the parts having the same relation as at the left channel frame. Nipple 241 of fitting 164' supplies lubricant to the intermediate bearings B B', B B² and B B³ of the brake cross-shafts B S and B S' in the manner apparent from Fig. 6 and from the description thereof below.

In the preferred mode of installation of the piping system briefly described, the various distributing fittings 155, 161, etc. would be initially mounted at their appropriate places upon the channel frames, axles, flywheel housing and other parts of the chassis, at appropriate holes provided for the purpose, and the various terminal drip plugs $dp$ would be applied at or in advance of the various bearings at line terminals. As appears from the foregoing description, there are three broad types of distributing fittings. Dividing fittings in general such as at 161, are mounted by bolts through their mounting lugs of the type shown at 156. Fittings 164 and 164', one outlet of each of which leads to the exterior side of the channel frame may be mounted at said nipples, without extra mounting lugs, as previously described. Dividing fittings such as at 186 and 200 and which are contiguous to one of the bearings supplied therefrom and in the run of the pipe line, may be mounted by threading directly into the bearing, the line drip plug element which constitutes the stem of the fitting as at B in Fig. 1.

The fittings being thus applied, the various connecting lengths of pipe would be mounted in position. Preferably lengths of copper or other bendable or soft metal seamless pipe of some elasticity is used. As best shown in Fig. 3, each pipe length pl is preferably positioned or located against endwise displacement by engagement of its previously flared ends e with the beveled clamping surfaces cl of the T nipples between which it is to be connected and is securely held after the couplings are made up by tightening the union nuts n, to form the secure couplings of the type shown at J in Fig. 1.

Each length of pipe is then preferably stapled or clipped at intervals as at st, to the part of the vehicle structure along which it extends. Each length of pipe is, of course, somewhat longer than the distance between the nipples which it connects, the extra length being accommodated by curving the pipe between the nipples, the extra length permitting of bending the soft copper pipe about obstructions or other special conformations on the chassis frame or other part, and assuring secure connection of the couplings at both ends, moreover, accommodating the weaving or distortion of the chassis frame in use, without strain on the couplings.

For lubricating the intermediate bearings on the brake cross-shafts B S and B S', line drip plugs 24' and 24² of the type shown at B in Fig. 1 are mounted in the lower part of bearings B B' and B B². At the final bearing B B³ is mounted a terminal or drip plug 25 of the type shown at A in Fig. 1, lengths of pipe 26, 27 and 28 being then connected between the fittings, as shown. Oil is thus fed through a continuous line lengthwise of the cross-brake shafts, and tapped from said line at intervals along the length thereof to the bearings. The valves and restrictions of the line drip plugs are only in the taps to the bearings, so that each passes only the lubricant for the bearing to which it is connected.

In the transverse line across the engine, I provide extra loops 250 in the short bridging portions near the channel frame, to accommodate the vibration of the engine relative to the frame. The loop 152 in pipe 119 connecting the reservoir and the pump, similarly accommodates any small relative displacement therebetween. Similar loops, not specially described, are located in various pipe sections that connect parts subject to small relative displacement in use of the vehicle.

*The bridging and spring runs*

Since the branches leading from the chassis frame to the axles must accommodate a degree of relative movement between said parts in the compression and rebound of the vehicle springs of higher order than that accommodated by the copper pipes on the frame, these sections are of metal pipe having greater elasticity, preferably relatively hard brass. The branch to the rear spring shown in detail in Fig. 7 includes for this purpose, the integral helical conformation 218 of brass pipe, constituting two or three turns, preferably approximately two or three inches in diameter, coaxial with the inner or concealed end of the hinge bolt V B, and having integral therewith the spring run 220 which extends lengthwise along the spring to the axle. The helix 218 which bridges from the chassis frame to the spring and is generically a bridging run, is preferably secured by a pair of encircling metal clips 251 and 252 within and against the closed end of a protective cylindrical cap 253. The cap 253 has lateral lugs 254 bolted as at 255 to the spring bolt bracket 211 against which the bottom of said cap clamps a closure disk 256. Cap 253 is cut-a-way near disk 256 as at 257 to provide an outlet adjacent the spring for the spring run 220 which preferably extends along the upper spring leaf, as shown. By the arrangement described, the helix 218 is previously secured in the cap 253, to form an assembly applied to the vehicle by simply securing lugs 254 by bolts 255 to bracket 211. Clip 251 is near the inlet to the helix, and clip 252 at the first or inlet convolution thereof. The former clip prevents any twisting or cocking of the helix in the process of making up the union at 212', or any possibility of the twist of the helix loosening the union, and the two clips maintain the helix against whipping up and down within the cap 253 in use of the vehicle.

In the preferred embodiment, the spring run is anchored at intervals, preferably to the upper or longest leaf of the spring.

A preferred anchor means is shown in Fig. 9 and comprises clamps, each of which preferably straddles and grips the upper or longest leaf of the spring. Each clamp comprises a pair of identical distinct clamp jaws, 260 and 261, in side by side relation, each an inverted U of less than half the width of the spring leaf, the inner or adjacent legs 262 of the U's upstanding from the upper spring leaf, and the outer leg of each U provided with an extension lip 263 curved inward, fitting under the convexity at the lower edge of the upper spring leaf. A sheet metal clip 264 encloses and mounts the pipe 220 and a bolt 265 extends transversely through the sides of the clip 264 through the two legs of each of the clamp jaws 260 and 261, in contact preferably with the upper surface of the upper spring leaf and is locked as by a lock nut 266 against clip 264. The pressure exerted by bolt 265 not only presses the inner legs of the clamp jaw members downward against the surface of the spring, to anchor said jaws, but forces the outer or straddling legs of the jaws together to grip the spring leaf between them, thereby forming a secure, yet readily detachable mount for the spring run. Preferably, a washer 267 about the bolt 265 serves as a spacer for the pipe 220 with respect to the spring, to afford sufficient clearance for the spring rebound clips (not shown), said washer having lateral tongues 267' which straddle the contiguous leg of clamp 260 to prevent rocking of the washer relative to the clip. The inner leg of clip 264 is preferably bent over the washer, as shown at 268 and the outer leg is provided with an integral lip 268 bent over one side of lock nut 266, thereby preventing rocking of the clip 264 about the bolt 265.

As the vehicle spring in operation undergoes compression and rebound, the helix 218 of the conduit will wind and unwind to accommodate the hinging movement of the spring end with respect to the chassis frame mount, while the spring run of the pipe will flex with the vehicle spring, each of the spring clamps 260—261 moving as a unit with the corresponding portion of the length of the upper spring leaf, the pipe lengths between successive spring clamps flexing only to accommodate the limited relative movement occurring between corresponding parts of the length of the spring. Thus, the flexure of the spring run is well distributed over the length thereof, to follow that of the spring itself, and no undue strain is exerted on the pipe, so that the latter will suffer no injury, even after prolonged and hard use. The entire length of the spring run 220 and of the helical hinging mount 218 being well protected back of the spring, between the ends and between the sides of the vehicle, no injury will occur even under severe traffic conditions.

The forward or hinge bolt end of the front springs being exposed to view and to impact in traffic, a transverse hinging coil of relatively large diameter, such as is employed at the rear spring might be unsightly and subject to injury even if encased. I accordingly prefer a special embodiment of hinging or bridging run, best shown in Fig. 10 and comprising seamless brass pipe formed into a helix or hollow spring 270 of external diameter in the order of only about ¾ inch, and extending in a direction generally longitudinally of the spring or chassis frame, and at the inner side of the chassis frame, as shown diagrammatically in Fig. 2. The brass helix, it will be seen, is fully protected both from lateral and head-on impact, and even the inner part thereof is protected and concealed by the usual apron Q in front of the radiator.

Referring to Fig. 10 in the preferred specific embodiment shown, the rear or chassis end of the helix 270 is supplied from the stem outlet 171 of the T-fitting 170. An integral length of pipe 272 beyond the helix end, as shown, is curved for this purpose, about the lower flange of the channel frame and is connected to the T-fitting stem nipple by an appropriate compression coupling. The rear or upper end of the helix 270 is mounted as by screwing over a correspondingly threaded stud 273, secured as at 274 to a metal bracket 275, which, in turn, is secured against the upper flange of the chassis frame C and is curved to conform therewith. The lower or forward end of the helix 270 is screwed over a stud 276 similar to stud 273 and similarly threaded, which, in turn, is mounted rigidly upon the upper leaf of the front spring V' and near the front or hinge bolt thereof, by a clamp construction, generally similar to the mounting arrangement for the spring run shown in Fig. 9. In order, however, to avoid interference with the rebound clip 277 nearest the hinge pin VB of the spring, the spring mount jaw member at one edge of the spring is of divided construction to straddle said clip, that is, two clamp jaw portions 278 and 279 at opposite sides of the rebound clip 277 are connected by an integral bridge piece 280, which clears said clip. A separate complementary clamp jaw member 282, which may be substantially identical with those shown in Fig. 9 is opposed to each of the two segments of the rebound clip-straddling jaw, and bolts 281 cause said clamps to grip the spring leaf in the same manner as in Fig. 9. The hinge end of the bridge piece 280 is formed integral with the bracket portion 283 upon which the stud 276 is secured. In order to clear the rivet 284 on the chassis frame C which in some vehicles may be substantially aligned with one or both of the clips 282, the latter may have an oblique inner leg as at 285.

To avoid excessive looseness or flapping of the helix 270 which might result in vehicle operation, if the helix 270 were of considerable length and to effect economies in the length of pipe required and to effect other advantages, which will become apparent as the description proceeds, it is desired to provide a helix of minimum axial length needed to afford the flexibility required. For this purpose the studs 273 and 276 are disposed in such relation that the length of the helix 270 will be a minimum when the vehicle spring is flexed to a position midway between that of the maximum compression and that of the maximum rebound, which may be incurred in use. In actual practice, it is found that the median position shown of the spring between line $a$—$a$ representing maximum compression and line $r$—$r$ representing maximum rebound, is above line $n$—$n$ which represents the normal position in the standing vehicle, so that in the normal position of the vehicle, the helix 270 will be distorted downward somewhat from minimum length.

In operation, it will thus be seen that the helix 270 will suffer substantially the same extension when the spring is deflected to maximum compression at a—a, as it will at maximum rebound at r—r. If the helix 270 were so connected that a greater tension occurs at one extreme of spring deflection and a lesser at the other, the helix would have to be of greater length or flexibility to safely accommodate the greater maximum tension. In the preferred embodiment, the studs 273 and 276 are so positioned that when the spring is in the median position shown, and the helix is under minimum stress, the prolongation of the axis of the helix will extend substantially through the center of hinge bolt VB.

It is apparent, of course, that a bridging run similar to that just described, may be advantageously used, if desired, to bridge to the rear spring. It is also apparent that the helix 218 which I have shown, for bridging to the rear spring, may also be arranged to be under minimum stress when the rear spring is midway between maximum compression and maximum rebound.

It will thus be seen that the piping can be installed upon the vehicle with facility. The resilient conduits which lead to the axles are preferably applied first. Cap 253 with encased helix 218 at the head of the branch to the rear axle is secured to the frame and the corresponding run 220 to the associated spring by the successive clamps 260—261. Helix 270 constituting the head of the branch to the front axle is positioned by threading thereon the mounting studs 273 and 276 and applying them to the vehicle at the brackets shown, and the corresponding spring run is attached by successive spring clamps, similar to those for the rear run. The ends of coil 270 being anchored at 273, twisting thereof will not tend to loosen the union at 171, nor, as heretofore pointed out, will twisting of helix 218 tend to loosen union 212′. The various distributed T and cross fittings having been previously affixed upon the various structural parts of the vehicle, selected lengths of soft copper pipe are connected in place between consecutive fittings in the manner previously described. Should any part of the pipe become injured or broken in use, only the short length injured need be removed and a similar replacement pipe length substituted therefor, to restore the entire system to operativeness. Should one of the vehicle springs have to be removed for replacement or repair, the spring run can readily be disconnected therefrom by loosening and removing the clamps and can as readily be applied to a substitute spring. Both in the initial application and in replacement, it will be seen that access of a wrench to tighten or loosen the couplings at the nipples of the T-fittings and cross-fittings, is readily had, since said nipples are sufficiently spaced by the T mounting appurtenances, from the corresponding parts of the vehicle structure.

In the arrangement of Fig. 2, it will be seen that there are two cross-lines 196 and 231, one at the engine and one at the brake cross-shafts connecting the two mains. One cross-line is sufficient for satisfactory operation. With the arrangement shown, however, the effect of conduit-line pressure drop is substantially eliminated, the pressure at the drip plug or plugs most remote from the pump being substantially identical with that at the drip plug or plugs nearest the pump, when the latter is discharging.

By reference to Fig. 2, it will be noted that I have disposed all piping terminals at parts that are rigidly attached to the frame axle, engine or other gross structure of the vehicle, so that the loosening or breaking strain on the pipes or couplings, is avoided, which might result, if a terminal were secured to a member performing even small rocking movements in operation, such as, for instance, the usual spring bolt.

It will be seen that the use of solder is avoided at the couplings for the pipe terminals. The soft copper pipe lends itself readily to flaring at its ends for making up the couplings shown at J in Fig. 1. The harder resilient brass pipes which are not readily flared are secured at their terminals by compression couplings.

The entire length of the distributing conduit or piping from the pump to each of the lubricating outlets or bearings, being nondilatable pressure-tight metal pipe, preferably seamless, as heretofore set forth, even those flexible or resilient lengths that accommodate the relative movements between the chassis frame and the axles, the flapping, splitting and leak which may occur in the use of ordinary flexible hose to convey lubricant or fluid pressure from the chassis frame to the axles, is wholly obviated.

By reason of the extremely slow rate of oil propulsion in the preferred system described, very small pipes, as small as $\frac{3}{32}''$ internal diameter may be and preferably are used. Such pipes lend themselves with particular facility to bending around obstructions on the chassis frames, as heretofore indicated, and to formation into the hollow springs and the spring runs, heretofore set forth in detail.

The particular arrangement and distribution of dividing or distributing T and cross-fittings in Fig. 2 of the drawings, constitutes but one manner illustratively shown, in which a particular construction of vehicle can be fitted for centralized chassis lubrication. It will readily be understood that dividing fittings could be distributed at various parts, within the scope of my invention, of the chassis frame and axles in other manners that will readily suggest themselves to those skilled in the art.

The layout of piping exemplified in the foregoing is not limited to chassis lubrication, but certain of the features thereof are applicable more broadly to fluid or pressure distributing or transmitting arrangements generally as, for instance, for hydraulic brake or speedometer operation.

In its application for lubrication, the piping installation is of general application to various modes of lubricant propulsion whether by pressure, gravity, airblast or other means. A pipe installation, such as that described, and especially the resilient parts thereof leading to the axles may also be employed as conduits for electric conductors leading to electric or electromagnetic apparatus on the axles, for instance, to be operated from a source of current controlled from the instrument board. A specific application would be to electromagnetically actuated oil or grease cups. It will also be seen that the electric conductors could be mounted unenclosed in conduits in the manner described.

The novel features of the pipe installation in their broader aspects are not limited in their application to motor vehicles, but may be employed in other relations, as for instance, for the lubrication of mechanisms generally, suggested diagrammatically in Fig. 1, such as textile machinery or printing presses, and for the lubrication of entire factory installations. Other applications within the scope of my invention, for transmitting pressure or fluid other than lubricant, will suggest themselves.

It will be seen that the operation of the system is equally effective, whether a multiplicity or only a few drip plugs are on the line; regardless of the application, whether for chassis lubrication or for the lubrication of stationary installations. In view of the fact that the relief valves at the other drip plugs on the line, and the seated pump piston at the head of the line, prevent venting, it will be apparent that an injured or defective drip plug may be removed and replaced substantially with the same facility as an electric lamp on a domestic lighting circuit. For substantially the reason just set forth, should a pipe length or a drip plug become injured, the rest of the system will still operate. By simply pinching together the ends of a broken pipe length, the entire system will operate, as well as if it were intact, except, of course, that the bearing or bearings on the broken line beyond the break would receive no lubricant until the injury was repaired.

The lubricating installation for a motor vehicle having been substantially described, it remains only to set forth in greater detail the specific construction for lubricating certain of the special parts on the motor vehicle.

By seamless I mean that the piping is devoid of open seams which would permit leakage of the lubricant from within the pipe.

In the present application is claimed the combined piping installation including outlets at various parts of the frame, additional outlets at the axle and the flexible construction bridging between the two sets of outlets. The present case also presents subcombination claims directed more particularly to the construction shown in Figs. 10 and 11 and dominating the disclosure in the copending application, Serial No. 627,953, filed March 27, 1923, and issued concurrently herewith.

I claim:—

1. A lubricating installation for mechanism of the type having relatively moving structures, bearings on each of the structure parts, pipe fittings rigid with each of the structure parts, and metal pipe lengths connected each between a pair of pipe fittings on the same structure part; the combination therewith of a length of resilient seamless metal piping joining fittings on different structure parts, said resilient pipe having extra length localized where the bending moment of the piping arising from the relative movement of the structure parts is a maximum.

2. In a motor vehicle of the type having a frame, structure therebelow, movable relative to the frame and including axles, bearings on the frame, bearings on the structure below the frame, pipe fittings at intervals on the frame and rigid therewith, pipe fittings at intervals on the structure below the frame and rigid therewith, and metal pipe lengths connected each between a pair of said pipe fittings to distribute the lubricant; the combination therewith of a length of resilient seamless metal piping connected between a fitting on the frame and a fitting on the structure below the frame, said resilient pipe having adjacent a part of the vehicle performing a hinging action between the frame and the structure therebelow, extra length localized adjacent said hinging portion.

3. The combination set forth in claim 2 in which the portion of the resilient pipe of extra length has a helical conformation and is supported on the vehicle structure free from rubbing contact with the adjacent parts of the vehicle.

4. In a motor vehicle of the type having a frame, structure therebelow movable relative to the frame and including axles, bearings on the frame, bearings on the structure below the frame, pipe fittings at intervals on the vehicle structure, and metal pipe lengths connected each between a pair of said pipe fittings to distribute the lubricant; the combination therewith of a plurality of lengths of resilient seamless metal piping, having coupling connections each between a corresponding fitting on the frame, and a corresponding fitting on the structure below the frame, each of said resilient pipes having a hollow spring conformation adjacent a part of the vehicle where occurs a hinging action between the frame and the structure therebelow, the parts being constructed and arranged in such manner that the twist of the spring conformation will not exert a loosening impulse on the attaching couplings for said hollow spring element.

5. In a motor vehicle of the type comprising an axle, a chassis frame and interposed springs, a conduit system for conveying fluid or pressure between the frame and the axle, said system comprising pipe fittings attached at intervals along said frame, and pipe lengths positioned at their ends by said fittings and forming a pipe line; the combination therewith of a flexible conduit length extending lengthwise of one of the springs to the axle, and clamps securing said flexible length at intervals along said spring for flexure thereof with said spring between said clamps.

6. In a motor vehicle of the type having axles, a chassis frame, interposed springs, bearings, some on said axles and some on said chassis frame, means for conveying lubricant simultaneously to all of said bearings from a single source, said means including pipe fittings secured at various parts on the chassis frame, pipe lengths connecting said pipe fittings in a continuous pipe line and having terminal couplings at said fittings, each of said fittings having one or more extra nipples, and branch pipes leading therefrom to various bearings on said chassis frame; the combination therewith of a branch pipe supplied from said line and extending lengthwise of one of said springs from the chassis frame to the corresponding axle, and means securing said branch pipe with respect to said spring at spaced intervals for flexure of said pipe with said spring to accommodate the relative movement between the chassis frame and the axle in operation of the vehicle.

7. In a motor vehicle of the type, comprising a chassis frame, axles and interposed springs, a plurality of bearings on the axles, a source of lubricant on the frame and means for conveying the lubricant from said source to all of said bearings, said means comprising pipe fittings rigidly connected to structural parts of said chassis frame, and lengths of pliable metal pipe connecting said fittings and supported thereby to form a continuous conduit, each of said fittings having one or more extra nipples for branch pipes to said bearings; the combination therewith of a hollow spring which comprises a helical hinge or bridging portion extending from the frame to a contiguous end of the spring, and a spring run extending lengthwise of the spring from the helical hinge to the axle.

8. In a lubricating installation for motor vehicles, in combination, mains extending lengthwise of the channel frame, a source of lubricant connected to one of said mains, a pipe extending transversely across the chassis for supplying lubricant to the other said main, said transverse pipe being connected rigidly between its ends with respect to the engine and having a coiled portion near each of its ends to afford the yield for accommodating the vibration of the engine relative to the frame, and a metal pipe substantially rigid with the engine, supplied from said transverse conduit and leading to bearings on the engine.

9. Means for lubricating a multiplicity of the bearings on the chassis of a motor vehicle, comprising a multiplicity of flow control fittings connected in lubricant delivering relation at various bearings on the frame and at various bearings on the axles of the vehicle, some of said fittings for terminal application having a single pipe terminal nipple, and others of said fittings for line run application having two or more nipples, distinct lengths of pipe connected between consecutive fittings and coupled thereto at the ends thereof, the pipes along the chassis frame structure being of relatively soft metal for ease in conforming and coupling thereof, the pipes extending from the chassis frame to the axles including hollow metal springs each located at a part of the vehicle where a hinging action occurs, in order to accommodate the greater relative displacement between the frame and the axles in vehicle operation.

10. In a fluid or pressure distributing system, means for conveying fluid or pressure from a point on the chassis frame to an axle of a motor vehicle, said means comprising a pipe mounting fitting on the chassis frame, a flow controlling outlet fitting at the axle, a length of resilient metal pipe connecting said fittings, said pipe having coupling connections at its terminals with respect to said fittings and clamped intermediate its ends at intervening parts of the structure of the vehicle and having extra length located at a part or parts of the vehicle where a hinging action occurs, in order to accommodate the relative displacement between said fittings in operation of the vehicle.

11. A fluid pressure transmitting connection between relatively moving parts of a structure, said connection comprising a seamless metal pipe having a spiral conformation to accommodate said relative movement, said spiral being in a condition of minimum stress when the parts of the structure are substantially midway between the extreme positions of displacement thereof, whereby the spiral element will be stressed to substantially the same extent at both extremes of the relative displacement of said structure parts.

12. In a vehicle which includes a chassis frame, an axle and an interposed spring, the combination therewith of a conduit for fluid pressure connected between the frame and the axle, said conduit including a flexible bridging run anchored at one end to the frame and at the other to the spring and near an end thereof, the spring end of said bridging run being arranged to move through substantially equal range for maximum compression and maximum rebound of the spring.

13. In a vehicle having a frame, an axle and interposed springs, a conduit connection from the frame to the axle, including a seamless metal helical bridging run extending in the general direction of the length of the frame and to the rear of the exposed side of the spring, and anchored at one end to the frame and at the other to the spring near the hinge end thereof, the prolonged axis of said bridging run extending substantially through the hinge axis of said spring when the spring is deflected to a position midway between maximum compression and maximum rebound, whereby the bridging run will be distorted equally at both said extreme positions.

14. An apparatus of the character described, comprising in combination, a conduit for supplying fluid or pressure from the chassis frame to an axle, said conduit including a helical seamless metal bridging run extending generally lengthwise of the channel frame and anchored to the frame at its rear end, and at its forward end to said spring near the eye thereof, said helical bridging run being at the inner side of the channel frame and of the spring, the entire length of said bridging run in the front of the radiator, said bridging run having a substantially straight axis, the prolongation of which extends through the hinge axis of said spring when the latter is deflected to a position midway between that of maximum compression and maximum rebound.

15. In combination, a vehicle spring, a seamless metal pressure-conveying conduit extending lengthwise thereof, and means detachably securing said conduit to said spring, said means comprising clamps at intervals along the length of the spring, each of said clamps having jaws straddling the spring, bolts forcing the jaws of the clamps together to grip the sides of said spring, each of said clamps constituting an anchor for the corresponding part of the conduit length.

16. Means for transmitting fluid or pressure between a chassis and an axle, said means comprising a metal pipe detachably connected and including a helical run bridging from the forward end of the chassis frame to near the bolt end of the spring, mounting studs respectively on the chassis and the spring for telescopic engagement with respect to the ends of said bridging run, a spring run communicating with said bridging run and extending lengthwise of the spring, and detachable clamp means at intervals along said spring for mounting said spring run.

17. In a lubricating installation for a vehicle having a frame, road-wheel axles, structural elements including springs connecting said frame and said axles, a conduit for conveying lubricant from said frame to a bearing on one of said axles, said conduit comprising a rigid pipe portion extending along said frame, a rigid pipe portion extending along one of said structural elements and leading to said bearing, said pipe being of helical form at the bridging portion thereof between the frame and said structural element, whereby said frame can vibrate relative to said axle in operation, without leak or rupture of said conduit.

18. A chassis lubricating installation for vehicles comprising small-bore, seamless piping along the frame leading to various bearings on said frame and to other bearings on the unsprung part of the vehicle, said piping including slack bridging portions from the frame to the unsprung part for supplying the bearings on the latter, means for applying pressure upon the oil in said piping, and high-resistance obstructions in said piping near said bearings for slow feed of oil through said obstructions to said bearings.

19. Means for lubricating from a source on the frame, bearings on an axle of a motor vehicle, said means comprising seamless oil-tight small-bore piping extending along said frame and having a helical bridging portion integral therewith extending to the frame supporting structure, said piping extending from said bridging portion along said supporting structure to the bearings on the axle, means for applying pressure upon the oil in said pipe, and obstruction means in said pipe near said bearings to absorb the pressure in said oil for slow supply thereof past said obstructions to said bearings.

20. In a chassis installation for a vehicle having a frame, an axle and interposed springs, in combination, a conduit for conveying liquid from the chassis frame to the axle, anchoring elements for said conduit, one carried by said frame and a second carried by said spring and near the forward eyes thereof, said conduit including a bridging run extending substantially free between said anchoring elements and wholly to the rear of the forward end of the spring and including a seamless metal tube of helical conformation affording flexibility for accommodation of the relative movement between the anchoring elements during spring flexure.

21. In a chassis installation for a vehicle having a frame, an axle and interposed springs, in combination, a conduit for conveying liquid from the chassis frame to the axle, means anchoring said conduit to said frame and to a part of said spring near an end thereof, said conduit including a bridging run extending substantially free between said anchoring means and wholly to the rear of the spring end, and including a seamless metal tube of helical conformation affording flexibility requisite to accommodate the relative movement between the anchoring means during spring flexure, said helix having its axis extending in the general direction of the length of the bridging run.

22. In a chassis installation for a vehicle having a frame, an axle and interposed springs, a conduit extending from the chassis frame to an axle, said conduit including a run anchored at one end near an end of one of the springs and at the other to a contiguous part of the channel frame, the entire length of said run being disposed between the flange of said channel frame and said spring and to the rear of the forward end of the spring and having flexibility for accommodation of the relative movement between the points of anchorage.

23. In a chassis installation for a vehicle having a frame, an axle and interposed springs, a conduit extending from a chassis frame to an axle, said conduit including a bridging run anchored near one end to the channel frame and near the other to a point near the bolt end of the spring, the entire length of said conduit being disposed between the flange of said channel frame and said spring and between the ends of the spring, and having flexibility to permit of the relative movement between the points of anchorage, the entire length of said bridging portion being disposed back of the plane of the exposed side of the spring.

24. In a chassis installation for a vehicle having a frame, an axle and interposed springs, a conduit for conveying liquid from the chassis frame to the axle, said conduit including a bridging run anchored at one end to the chassis frame and at the other near an end of one of the springs, said run being disposed wholly to the rear of the spring end and between the spring and the upper flange of the channel frame, and back of the exposed side of the spring, said bridging run including a flexible element having its axis extending in the general direction of the length of the contiguous channel frame portion and having sufficient stiffness between the anchoring points to prevent substantial flapping under vibration.

25. In a vehicle of the type including an axle, a channel frame, springs interposed therebetween and anchored by bolts to the frame and at their forward ends; the combination therewith of a lubricating installation including a fastener at one side of the channel frame and substantially to the rear of the corresponding spring bolt, a fastener on the spring and near the bolt end thereof, and a bridging run extending between said fasteners and including a flexible portion, extending in the general direction of the length of the contiguous channel frame portion and having sufficient stiffness between the fasteners to prevent substantial flapping under vibration.

26. In a motor vehicle chassis of the type including an axle, a chassis frame, springs interposed therebetween, in combination, a fluid conduit including a bridging run secured at opposite ends respectively to the lower flange of the channel, and to one of the springs and near the bolt end thereof, said bridging run being of length materially greater than the distance between its ends and presenting an axis substantially in a straight line and wholly back of the exposed side of the spring and having sufficient stiffness to prevent flapping under vibration.

27. In a chassis installation for a vehicle having a frame, an axle and interposed springs, a conduit for conveying liquid from the chassis frame to the axle, said conduit including a bridging run from the chassis frame to near an eye of the spring, said bridging run including a flexible helical seamless metal tube, and anchoring means for said run comprising a stud mounted on the spring and near an eye thereof about which one end of said helical conduit is threaded, and a second similar stud secured to the lower flange of the channel frame to the rear of the first stud and similarly mounting the other end of the helical conduit.

28. In a vehicle of the type including an axle, a chassis and an interposed spring having a hinging eye connection with the chassis frame, a conduit for conveying liquid between the chassis frame and the axle, said conduit including a flexible bridging run and a spring run, said spring run extending lengthwise of and being attached at intervals to one of the leaves of the spring, and flexing therewith, and anchoring means for the contiguous ends of the flexible bridging run and the spring run, said anchoring means being disposed back of the spring eye and being secured to the same leaf as said spring run.

29. In a vehicle which includes a chassis frame, an axle and interposed springs, each of said springs having a pivot part, a conduit to an axle including a flexible bridging run anchored at one part thereof to one of the springs and near the pivot part of said spring and at another at a part contiguous thereto, with respect to which said spring moves, and another run disposed along said spring for change of curvature therewith and free from rubbing contact with the sides of the spring.

30. In a vehicle having a frame, an axle and interposed springs, a conduit connection from the frame to the axle including a bridging run having a flexible part and anchored at one part to the frame and at another near an end of one of the springs, and a spring run disposed back of the exposed side of said spring for change of curvature therewith and protected by the spring against impact from the side of the vehicle.

31. In a vehicle having a frame, an axle and interposed springs, a conduit for conveying liquid from the frame to the axle, said conduit including a flexible bridging run to a point on one of the springs and near an end thereof from a contiguous part of the frame, and a run extending in a direction lengthwise of the spring to the axle and having a plurality of parts thereon fixed with respect to corresponding parts of the spring structure, said conduit being flexible between the fixed parts, whereby the displacement and deformation of the spring relative to the frame will effect distributed flexure of the conduit.

32. In a chassis lubricating installation for a vehicle having a frame, an axle and interposed springs, a conduit for conveying liquid pressure between the chassis frame and the axle, said conduit including a bridging run anchored at one end to the frame and at the other to a part moving with one end of the spring, said bridging run having flexibility to accommodate the limited relative displacement between the anchored parts thereof, but being sufficiently rigid to prevent whipping under vibration.

33. In a chassis installation for a vehicle having a frame, an axle and interposed springs, in combination therewith, a conduit for conveying liquid lengthwise of one of the springs, anchor means securing said conduit to the spring structure at a plurality of points lengthwise thereof, said conduit extending between consecutive anchor points in a course having flexibility sufficient to accommodate the relative displacement between said anchor points in the deformation of the spring.

34. In a chassis installation for a vehicle having a frame, an axle and interposed springs, in combination, a conduit for conveying liquid from the chassis frame to the axle, anchoring means for said conduit, one carried by said frame and a second carried by said spring and near a point of maximum flexibility thereof, said conduit including a bridging run extending between said anchoring means, said bridging run including a seamless metal tube of helical conformation affording flexibility for accommodation of relative movement between the anchoring means during spring flexure.

35. In a chassis installation for a vehicle having a frame, an axle and interposed springs, each having a pivoted part, in combination, a conduit for conveying liquid from the chassis frame to the axle, anchoring elements for said conduit, one carried by said frame and a second by said spring and near said pivot part, said conduit including a bridging run extending substantially free between said anchoring elements and including a seamless metal tube of helical conformation adjacent said pivot part and affording flexibility for accommodation of the relative movement at said pivot part during spring flexure.

36. In a chassis installation, in combination, a conduit for bridging from the chassis frame to an axle, said conduit including a spring run and a tubular metallic helical hinging bridging connection between an end of the spring run and the chassis frame.

37. In a motor vehicle, in combination, a chassis frame, an axle, a spring connecting said elements, conduit anchoring means distributed along the length of the spring and moving with the flexure of the spring at corresponding points, and a conduit extending in a direction lengthwise of said spring anchored at said mounting means and extending for freedom of flexure between successive mounting means.

38. In a motor vehicle, in combination, a vehicle spring structure, auxiliary supporting means on said spring structure and including conduit anchoring means distributed lengthwise of the spring, and a liquid conduit attached at successive anchoring means, said conduit having flexibility sufficient to accommodate the deformation of the spring.

39. In a chassis lubricating installation, a vehicle spring connected between the chassis frame and an axle, a plurality of fasteners protruding from the spring at one of the sides thereof and moving in conformity with the flexing movement of the spring and a conduit anchored upon said fasteners and flexing to accommodate the differential displacement of consecutive fasteners.

40. In a vehicle of the type which includes a chassis frame, an axle and an interposed spring structure which has a pivot part; the combination therewith of a conduit for fluid, connected between the frame and the axle, said conduit including a yielding connection from the frame to the vicinity of said pivot parts the ends of which are closely adjacent to but substantially spaced from said pivot part and a run extending in a direction lengthwise of the spring toward the axle and disposed for distributed flexure thereof with said spring.

Signed at New York, in the county of New York and State of New York, this 19th day of February, A. D. 1924.

JOSEPH BIJUR.